US012155244B2

(12) United States Patent
Namuduri et al.

(10) Patent No.: US 12,155,244 B2
(45) Date of Patent: Nov. 26, 2024

(54) HIGH VOLTAGE ARCHITECTURE FOR MULTI-PORT CHARGING SYSTEM

(71) Applicant: GM Global Technology Operations LLC, Detroit, MI (US)

(72) Inventors: Chandra S. Namuduri, Troy, MI (US); Suresh Gopalakrishnan, Troy, MI (US); Lei Hao, Troy, MI (US); Venkata Prasad Atluri, Novi, MI (US); Rashmi Prasad, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 141 days.

(21) Appl. No.: 17/988,000

(22) Filed: Nov. 16, 2022

(65) Prior Publication Data

US 2024/0162727 A1 May 16, 2024

(51) Int. Cl.
| | |
|---|---|
| *B60L 50/15* | (2019.01) |
| *B60L 50/60* | (2019.01) |
| *B60L 53/14* | (2019.01) |
| *B60L 53/60* | (2019.01) |
| *H01M 10/42* | (2006.01) |
| *H01M 10/44* | (2006.01) |
| *H01M 50/583* | (2021.01) |
| *H02J 7/00* | (2006.01) |

(52) U.S. Cl.
CPC .......... *H02J 7/00304* (2020.01); *B60L 50/60* (2019.02); *B60L 53/14* (2019.02); *B60L 53/60* (2019.02); *H01M 10/425* (2013.01); *H01M 10/441* (2013.01); *H01M 50/583* (2021.01); *H02J 7/0013* (2013.01); *H02J 7/0063* (2013.01); *H02J 7/0068* (2013.01); *H01M 2200/103* (2013.01); *H01M 2220/20* (2013.01)

(58) Field of Classification Search
CPC .. H02J 7/00; B60L 50/60; B60L 53/14; B60L 53/60; H01M 10/42; H01M 10/44; H01M 50/583

See application file for complete search history.

(56) References Cited

U.S. PATENT DOCUMENTS

| | | | |
|---|---|---|---|
| 10,661,679 B2 * | 5/2020 | Botts | B60L 58/19 |
| 2012/0161715 A1 * | 6/2012 | Park | H02J 7/0016 |
| | | | 320/136 |
| 2019/0225095 A1 * | 7/2019 | Hiroe | B60L 58/15 |
| 2019/0283625 A1 * | 9/2019 | Eriksson | H02J 7/0024 |

\* cited by examiner

*Primary Examiner* — Jared Fureman
*Assistant Examiner* — Esayas G Yeshaw
(74) *Attorney, Agent, or Firm* — CANTOR COLBURN LLP

(57) ABSTRACT

An electric vehicle includes an electrical system and performs a method of charging the electric vehicle. The electrical system includes a first battery subpack, a second battery subpack, wherein the first battery subpack, the second battery subpack, and an electrical load of the electric vehicle are connected in parallel, and a processor. The processor is configured to control a first connection between the first battery subpack and a first charge port and a second connection between the second battery subpack and a second charge port to charge each of the first battery subpack and the second battery subpack while providing power to the electrical load.

20 Claims, 6 Drawing Sheets

HIGH VOLTAGE ARCHITECTURE FOR MULTI-PORT CHARGING SYSTEM

INTRODUCTION

The subject disclosure relates to electric vehicles and, in particular, to a system for charging multiple battery subpacks of an electric vehicle.

Medium-duty and heavy-duty electric vehicles operate using high voltage battery sources. Charging the battery sources can be a time-consuming operation, due to the amount of charging necessary as well as to limits on the rate at which charging can be performed to prevent overheating. Accordingly, it is desirable to provide a battery system that can be charged with reduced charging times.

SUMMARY

In one exemplary embodiment, a method of charging an electric vehicle is disclosed. The method includes controlling, via a processor, a first connection between a first battery subpack and a first charge port and a second connection between a second battery subpack and a second charge port to charge each of the first battery subpack and the second battery subpack while providing power to an electrical load, wherein the first battery subpack, the second battery subpack, and the electrical load of the electric vehicle are connected in parallel.

In addition to one or more of the features described herein, the method further includes providing power to the electrical load from both the first battery subpack and the second battery subpack while charging using only one of the first charge port and the second charge port. The method further includes charging the first battery subpack via the first charge port and the second battery subpack via the second charge port while providing power to the electrical load via only one of the first battery subpack and the second battery subpack. The method further includes performing a pre-charging operation at one of the first battery subpack and the second battery subpack prior to charging a respective one of the first battery subpack and the second battery subpack. Performing the pre-charging operation further includes one of pre-charging one of a first pre-charge resistor associated with the first battery subpack and a second pre-charge resistor associated with the second battery subpack, controlling one of a first solid-state relay associated with the first battery subpack and a second solid-state relay associated with the second battery subpack, and pre-charging using a resistor shared by the first battery subpack and the second battery subpack. The method further includes one of blowing a first charge port fuse at the first charge port in a presence of an overcurrent at the first charge port, detecting, during individual charging of the first battery subpack, the overcurrent at the first charge port via a first charge port current sensor associated with the first charge port and blowing a first pyro fuse associated with the first battery subpack in response to a signal from the first charge port current sensor, and detecting, during charging of both the first battery subpack and the second battery subpack, the overcurrent at the first charge port via a first charge port current sensor associated with the first charge port and blowing a first pyro fuse associated with the first battery subpack and a second pyro fuse associated with the second battery subpack in response to a signal from the first charge port current sensor. In various embodiments, either the first connection is electrically isolated from the second connection, the first charge port and the second charge port are electrically connected to each other, or both.

In another exemplary embodiment, an electrical system of an electric vehicle is disclosed. The electrical system includes a first battery subpack, a second battery subpack, wherein the first battery subpack, the second battery subpack, and an electrical load of the electric vehicle are connected in parallel, and a processor. The processor is configured to control a first connection between the first battery subpack and a first charge port and a second connection between the second battery subpack and a second charge port to charge each of the first battery subpack and the second battery subpack while providing power to the electrical load.

In addition to one or more of the features described herein, the processor is further configured to control the first connection and the second connection to provide power to the electrical load from both the first battery subpack and the second battery subpack while charging only one of the first battery subpack and the second battery subpack. The processor is further configured to control the first connection and the second connection to charge the first battery subpack via the first charge port and the second battery subpack via the second charge port while providing power to the electrical load via only one of the first battery subpack and the second battery subpack. The processor is further configured to perform a pre-charging operation at one of the first battery subpack and the second battery subpack prior to charging a respective one of the first battery subpack and the second battery subpack. Performing the pre-charging operation further comprises one of pre-charging one of a first pre-charge resistor associated with the first battery subpack and a second pre-charge resistor associated with the second battery subpack, controlling one of a first solid-state relay associated with the first battery subpack and a second solid-state relay associated with the second battery subpack, and pre-charging using a resistor shared by the first battery subpack and the second battery subpack. The electrical system further includes one of a first charge port fuse at the first charge port configured to blow in a presence of an overcurrent at the first charge port, a first charge port current sensor at the first charge port configured to send a signal upon detecting the overcurrent at the first charge port, and a first pyro fuse associated with the first battery subpack and a second pyro fuse associated with the second battery subpack, wherein the first pyro fuse is configured to blow in response to the signal during individual charging of the first battery subpack and the first pyro fuse and the second pyro fuse are configured to blow in response to the signal during charging of both the first battery subpack and the second battery subpack. In various embodiments, either the first connection is electrically isolated from the second connection, the first charge port and the second charge port are electrically connected to each other, or both.

In another exemplary embodiment, an electric vehicle is disclosed. The electric vehicle includes a first battery subpack, a second battery subpack, wherein the first battery subpack, the second battery subpack, and an electrical load of the electric vehicle are connected in parallel, and a processor. The processor is configured to control a first connection between the first battery subpack and a first charge port and a second connection between the second battery subpack and a second charge port to charge each of the first battery subpack and the second battery subpack while providing power to the electrical load.

In addition to one or more of the features described herein, the processor is further configured to control the first connection and the second connection to provide power to the electrical load from both the first battery subpack and the second battery subpack while charging only one of the first battery subpack and the second battery subpack. The processor is further configured to control the first connection and the second connection to charge the first battery subpack via the first charge port and the second battery subpack via the second charge port while providing power to the electrical load via only one of the first battery subpack and the second battery subpack. The processor is further configured to perform a pre-charging operation at one of the first battery subpack and the second battery subpack prior to charging a respective one of the first battery subpack and the second battery subpack, wherein the pre-charging operation is performed at one of a first pre-charge resistor associated with the first battery subpack and a second pre-charge resistor associated with the second battery subpack, a first solid-state relay associated with the first battery subpack and a second solid-state relay associated with the second battery subpack, and a resistor shared by the first battery subpack and the second battery subpack. The electric vehicle further includes one of a first charge port fuse at the first charge port configured to blow in a presence of an overcurrent at the first charge port, a first charge port current sensor at the first charge port configured to send a signal upon detecting the overcurrent at the first charge port, and a first pyro fuse associated with the first battery subpack and a second pyro fuse associated with the second battery subpack, wherein the first pyro fuse is configured to blow in response to the signal during individual charging of the first battery subpack and the first pyro fuse and the second pyro fuse are configured to blow in response to the signal during charging of both the first battery subpack and the second battery subpack. In various embodiment, either the first connection is electrically isolated from the second connection, the first charge port and the second charge port are electrically connected to each other, or both.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
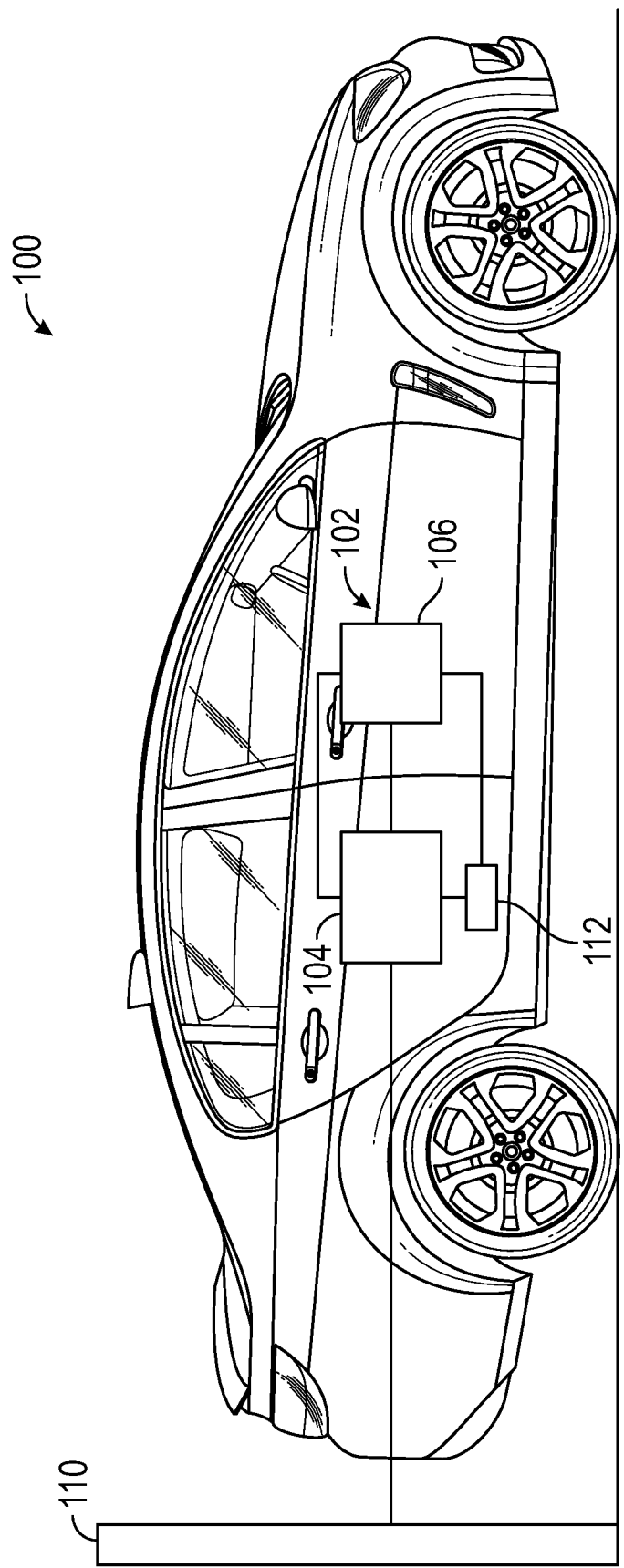
FIG. 1 shows an electric vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows an electric vehicle 100. The electric vehicle 100 includes an electrical system 102 including a battery system 104 and an electrical load 106 which operates using power provided by the battery system. The electrical load 106 can include accessory loads, such as radio, air conditioning, power windows, etc. As shown in FIG. 1, the vehicle is plugged into a charging station 110 which charges the battery system 104.

The electric vehicle 100 further includes a controller 112. The controller 112 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 112 may include a non-transitory computer-readable medium that stores instructions which, when processed by one or more processors of the controller 112, implement a method of controlling a charging operation for the battery system 104.

Figure 2:
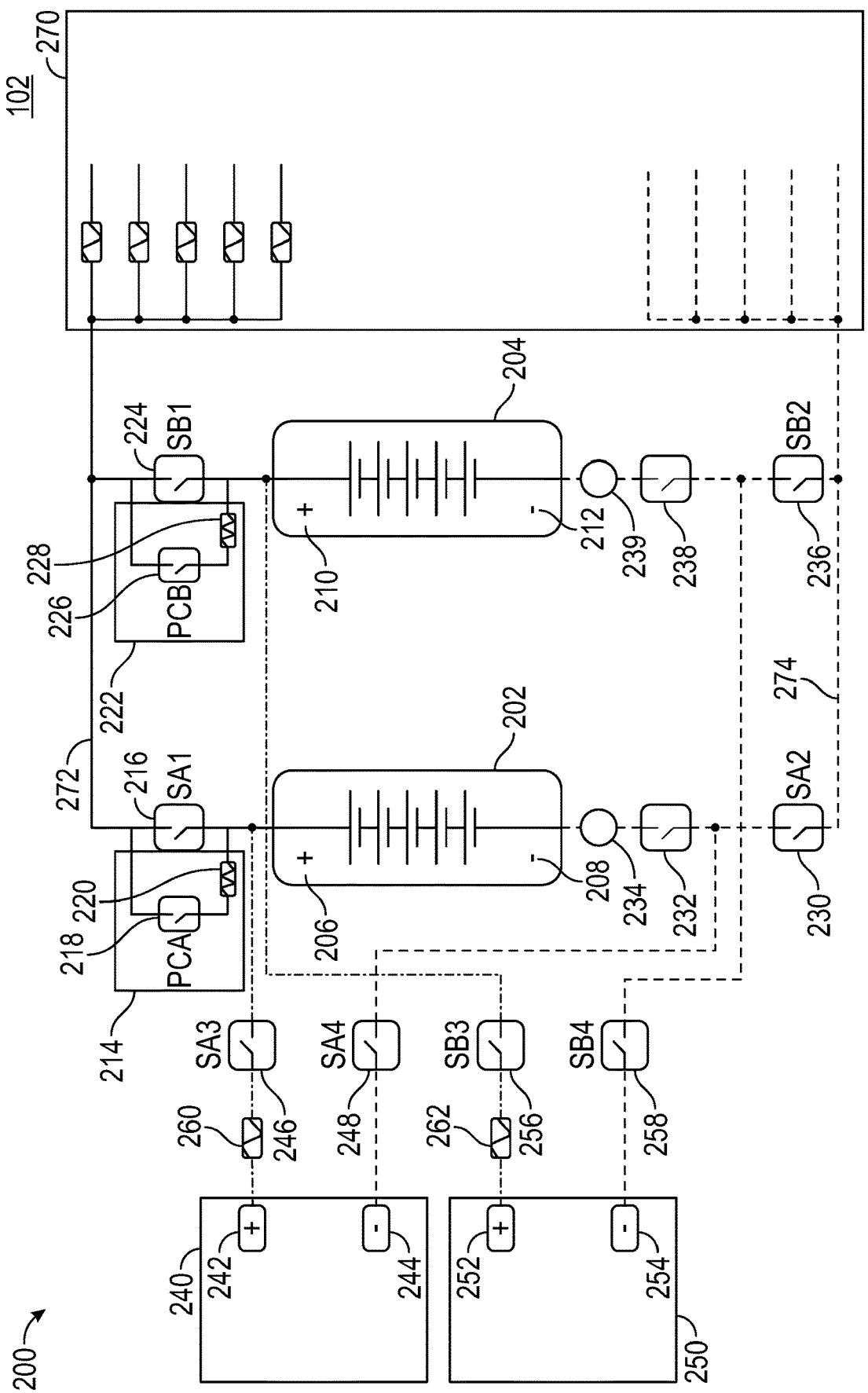
FIG. 2 shows a circuit diagram of an electrical system of the electric vehicle, in a first embodiment.

FIG. 2 shows a circuit diagram 200 of the electrical system 102 of the electric vehicle 100, in a first embodiment. The electrical system 102 includes a first battery subpack 202 and a second battery subpack 204. The first battery subpack 202 and the second battery subpack 204 are high voltage battery subpacks. In an embodiment, at least one of the first battery subpack 202 and the second battery subpack 204 can hold a voltage of 800 Volts (V) when fully charged. The first battery subpack 202 includes a first positive terminal 206 and a first negative terminal 208. The second battery subpack 204 includes a second positive terminal 210 and a second negative terminal 212. The first battery subpack 202 and the second battery subpack 204 can be connected in parallel with each other and with vehicle propulsion and accessory loads 270 of the electrical load 106 via a high voltage (HV) positive bus 272 at the positive terminals and a HV negative bus 274 at the negative terminals.

A first pre-charge device 214 and a first main switch 216 (SA1) are located between the first positive terminal 206 of the first battery subpack 202 and the HV positive bus 272. The first pre-charge device 214 runs parallel to the first main switch 216 (SA1) and includes a first pre-charge switch 218 (PCA) and a first pre-charge resistor 220. In general operation, the first main switch 216 (SA1) is closed and the first pre-charge switch 218 (PCA) is open, allowing current to bypass the first pre-charge resistor 220. During a pre-charging operation, the first main switch 216 (SA1) is open and the first pre-charge switch 218 (PCA) is closed, causing current to flow through the first pre-charge resistor 220, thereby limiting an inrush current along the HV positive bus 272 and at the vehicle propulsion and accessory loads 270.

A first return switch 230 (SA2), a first pyro-fuse 232 (Pyro 1) and a first sub-pack/charge port current sensor 234 are located between the first negative terminal 208 and the HV negative bus 274.

During a key-on event, the first return switch 230 (SA2) and the pre-charge switch 218 are both closed so that the first subpack 202 can power the HV positive bus 272. The pre-charge resistor 220 prevents a high inrush current along the HV positive bus 272. Once the HV positive bus 272 reaches a voltage level close to the battery subpack voltage, the pre-charge process is complete. The first pre-charge switch 218 is then opened and the first main switch 216 is closed.

Similarly, a second pre-charge device 222 and a second main switch 224 (SB1) are located between the second positive terminal 210 of the second battery subpack 204 and the HV positive bus 272. The second pre-charge device 222 runs parallel to the second main switch 224 (SB1) and includes a second pre-charge switch 226 (PCB) and a second pre-charge resistor 228. In a general operation, the second main switch 224 (SB1) is closed and the second pre-charge switch 226 (PCB) is open, allowing current to bypass the second pre-charge resistor 228. During a pre-charging operation, the second main switch 224 (SB1) is open and the second pre-charge switch 226 (PCB) is closed, causing current to flow through the second pre-charge resistor 228, thereby limiting an inrush current along the HV positive bus 272 and at the propulsion and accessory loads 270.

A second return switch 236 (SB2), a second pyro-fuse 238 (Pyro 2) and a second sub-pack/charge port current sensor 239 are located between the second negative terminal 212 and the HV negative bus 274.

During a key-on event, the second return switch 236 and the second pre-charge switch 226 can be closed so that the second battery subpack 204 can power the HV bus 272. The pre-charge resistor 228 prevents a high inrush current along the HV positive bus 272. Once the HV positive bus 272 reaches close to the battery voltage of the second battery subpack 204, the pre-charge process is complete. The second pre-charge switch 226 is opened and the second main switch 224 is then closed.

If the first battery subpack 202 is the first subpack to be connected to the HV positive bus 272 for pre-charging, the second battery subpack 204 can be connected in parallel while the first sub-pack 202 is pre-charging by closing the second main switch 224 and a second return switch 236 without the need for implementing the second pre-charge device 222. Similarly, if the second battery subpack 204 is the first subpack connected to the HV positive bus for pre-charging, the first battery subpack 202 can be connected in parallel while the second battery subpack 204 by closing the first main switch 216 and the first return switch 230 without need for implementing the first pre-charge device 214.

During a charging operation, the first battery subpack 202 can be coupled to a first charge port 240, through which a connection is made to the charging station 110. In various embodiments, the first charge port 240 is a direct current fast charging (DCFC) port. The first charge port 240 includes a first positive charge terminal 242 and a first negative charge terminal 244. The first positive charge terminal 242 connects to the first positive terminal 206 of the first battery subpack 202. The first negative charge terminal 244 connects between the first return switch 230 (SA2) and the first fuse 232 (Pyro 1). A switch 246 (SA3) at the first positive charge terminal 242 controls a connection between the first positive charge terminal and the first positive terminal 206. A switch 248 (SA4) at the first negative charge terminal 244 controls a connection between the first negative charge terminal and the first negative terminal 208. A first charge port fuse 260 is located at the first positive charge terminal 242 and can activate or blow in the event of an overcurrent.

Similarly, during the charging operation the second battery subpack 204 can be coupled to a second charge port 250 through which a connection is made to the charging station 110. In various embodiments, the second charge port 250 is a direct current fast charging (DCFC) port. The second charge port 250 includes a second positive charge terminal 252 and a second negative charge terminal 254. The second positive charge terminal 252 connects to the second positive terminal 210 of the second battery subpack 204. The second negative charge terminal 254 connects between the second return switch 236 (SB2) and the second fuse 238 (Pyro 2). A switch 256 (SB3) at the second positive charge terminal 252 controls a connection between the second positive charge terminal 252 and the second positive terminal 210. Similarly, a switch 258 (SB4) at the second negative charge terminal 254 controls a connection between the second negative charge terminal 254 and the second negative terminal 212. A second charge port fuse 262 is located at the second positive charge terminal 252 and can activate or blow in the event of an overcurrent.

Controller 112 can be coupled to each of the switches (i.e., SA1, SA2, SA3, SA4, PCA, Pyro 1, SB1, SB2, SB3, SB4, PCB, Pyro 2) and can control operation of the switches. The controller 112 can switch the configuration of these switches to accommodate a given mode of operation of the battery subpacks. It is noted that the first charge port 240 can is used to charge the first battery subpack 202 and the second charge port 250 is used to charge the second battery subpack 204. Table 1 shows various exemplary operational modes and the switching configurations that accompany them.

TABLE 1

| MODE | SA1 | SA2 | SA3 | SA4 | SB1 | SB2 | SB3 | SB4 | PCA | PCB | Pyro 1 | Pyro 2 |
|---|---|---|---|---|---|---|---|---|---|---|---|---|
| Key Off | OFF | OFF | OFF | OFF | OFF | OFF | OFF | OFF | OFF | OFF | ON | ON |
| Pre charge | OFF | OFF | OFF | OFF | OFF | OFF | OFF | OFF | ON | ON | ON | ON |
| Propulsion | ON | ON | OFF | OFF | ON | ON | OFF | OFF | OFF | OFF | ON | ON |
| DCFC Parallel 1 | ON | ON | ON | ON | ON | ON | OFF | OFF | OFF | OFF | ON | ON |
| DCFC Individual | ON | ON | ON | ON | OFF | OFF | ON | ON | OFF | OFF | ON | ON |
| DCFC Dual Port Parallel | ON | ON | ON | ON | ON | ON | ON | ON | OFF | OFF | ON | ON |
| DCFC Parallel 2 | ON | ON | OFF | OFF | ON | ON | ON | ON | OFF | OFF | ON | ON |
| SC Fault Pack A | OFF | OFF | OFF | OFF | ON | ON | ON | ON | OFF | OFF | OFF | ON |

Table 1 or a similar table can be stored at a memory device. In various embodiments, the controller 112 can access the table when the vehicle is placed into one of the modes shown. The controller 112 can then change the configuration of the switches as indicated by the entries in the table.

The controller 112 can control a connection between the first battery subpack 202 and the first charge port 240 and also a connection between the second battery subpack 204 and the second charge port 250. The connections can be made to charge the first battery subpack 202 and the second battery subpack 204 either individually or together. A battery subpack can be connected so as to be both charging and providing power to an accessory load at the same time. Both subpacks can be connected in parallel and charged from either one of the charge ports or from both charge ports simultaneously.

During a parallel charging operation in which a single charge port is used, only one of the battery subpacks is connected to its charge port for charging while both battery subpacks are connected in parallel to the accessory load 270. In an individual charging operation, both battery subpacks are connected to their respective charge ports, while only one subpack is connected to the accessory load.

The controller can also send the switches into a configuration for performing a pre-charging operation at one of the first battery subpack and the second battery subpack. This configuration can be made prior to charging operation at either of the first battery subpack and the second battery subpack.

The electric system of FIG. 2 allows for the accessory loads to be supported during a charging operation. The accessory loads are protected from an inrush of current by the pre-charge devices. The subpacks can be charged either simultaneously in parallel or individually via each charge port. Thus, a single charge port can be utilized while another charge port is not used. Sensors obtain measurements of various parameters of the electrical system, such as voltage, current, temperature, etc. These measurements can be used to control the charging current that is drawn from the charge port. In an embodiment, one charge port can be on one side of the vehicle and another charge port can be on another side of the vehicle. Although two battery subpacks are illustrated herein, it is understood that any number of battery subpacks can be utilized in other embodiments of the electrical system.

Figure 3:
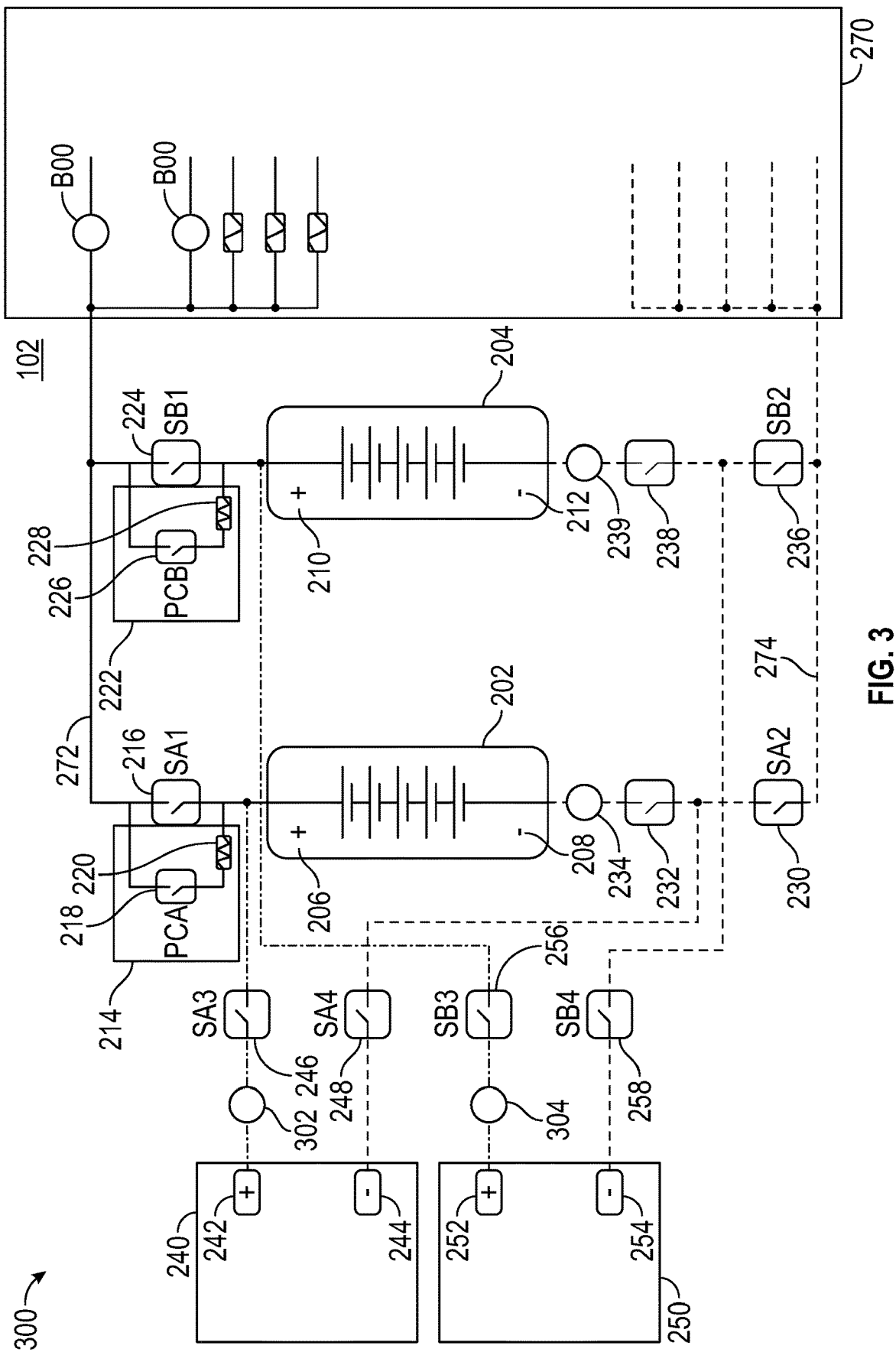
FIG. 3 shows a circuit diagram of the electrical system in a second embodiment.

FIG. 3 shows a circuit diagram 300 of the electrical system 102, in a second embodiment. Instead of the first charge port fuse 260 shown in the first embodiment, a first charge port current sensor 302 is located at the first positive charge terminal 242. The first charge port current sensor 302 is in communication with the controller 112 and sends a signal to the controller upon detecting an overcurrent. When the first charge port is being used to charge only the first subpack 202, and the current sensor 302 detects an overcurrent through the first charge port 240, the controller 112 sends a signal to the first fuse 232 (Pyro 1) to activate or blow (i.e., open the circuit between the HV negative bus 274 and the first battery subpack 202). When the first charge port 240 is being used to charge both the first subpack 202 and the second subpack 204 in parallel, and current sensor 302 detects an overcurrent through the first charge port 240, the controller 112 sends a signal to both the first fuse 232 (Pyro 1) and second fuse 238 (Pyro 2) to activate or blow (i.e., open the circuit between the HV negative bus 274 and the first battery subpack 202 and second battery subpack 204).

Similarly, a second charge port current sensor 304 is located at the second positive charge terminal 252. The second charge port current sensor 304 is in communication with the controller 112 and sends a signal to the controller upon detecting an overcurrent. When the second charge port is being used to charge only the second subpack 204, and the current sensor 304 detects an overcurrent through the second charge port 250, the controller 112 sends a signal to the second fuse 238 (Pyro 2) to activate or blow (i.e., open the circuit between the HV negative bus of 274 and the second battery subpack 204). When the second charge port is being used to charge both the first subpack 202 and the second subpack 204 in parallel, and the current sensor 304 detects an overcurrent through the second charge port 250, the controller 112 sends a signal to both the first fuse 232 (Pyro 1) and second fuse 238 (Pyro 2) to activate or blow (i.e., open the circuit between the HV negative bus 274 and the first battery subpack 202 and second battery subpack 204).

Figure 4:
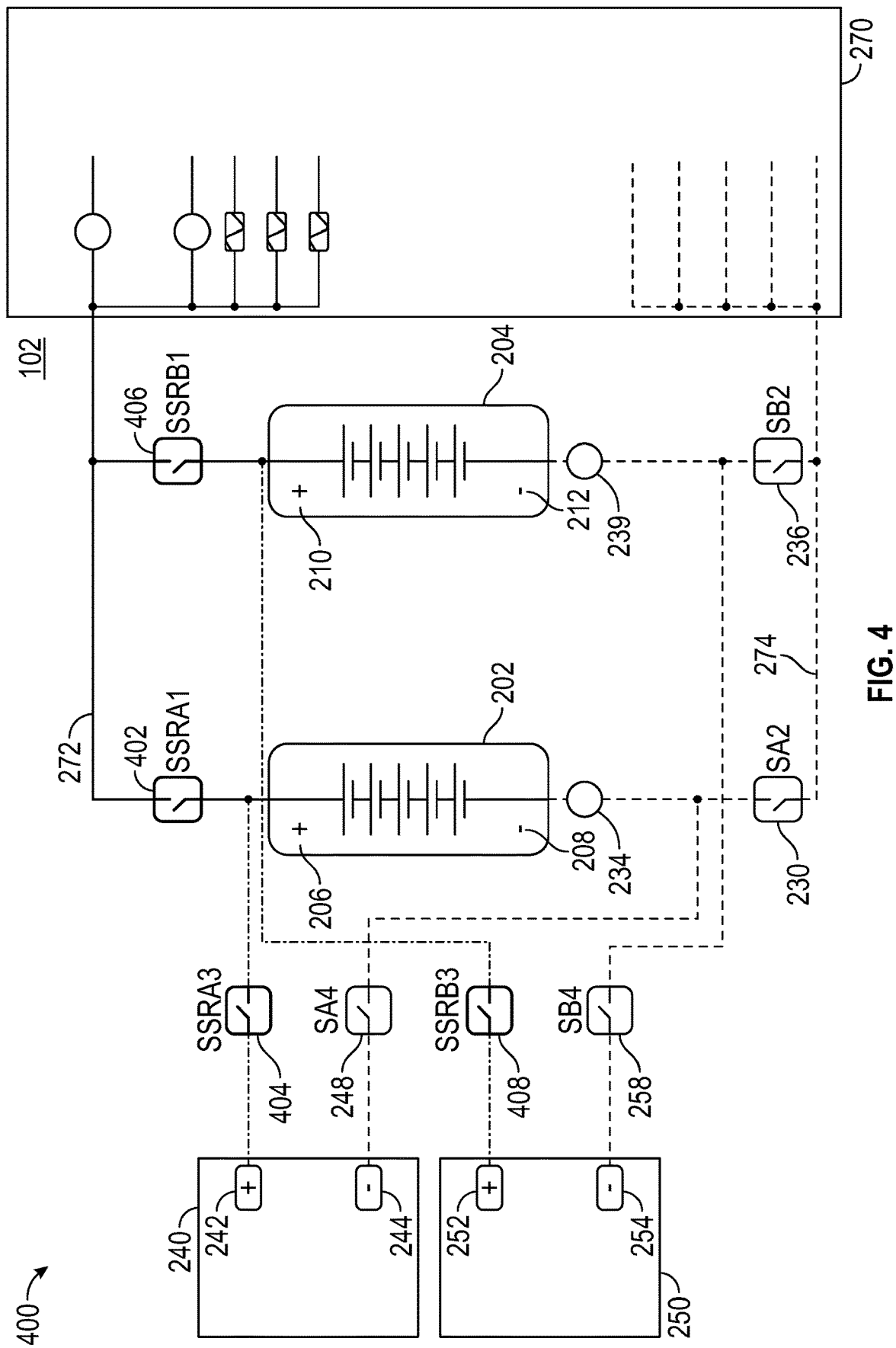
FIG. 4 shows a circuit diagram of the electrical system in a third embodiment.

FIG. 4 shows a circuit diagram 400 of the electrical system 102, in a third embodiment. In comparison to the first embodiment, a first solid-state relay 402 (SSRA1) replaces the first pre-charge device 214 and first main switch 216. Also, switch 246 (SA3) has been replaced by a second solid-state relay 404 (SSRA3) at the first positive charge terminal 242. The controller 112 can turn the first solid-state relay 402 on or off or make it act as a variable resistor. Also, the controller 112 can turn the second solid-state relay 404 on or off. The first fuse 232 (Pyro 1) has been removed altogether. The locations of solid-state relay 402 and switch 230 (SA2) can be interchanged. Similarly, the locations of solid-state relay 404 and switch 248 (SA4) can be interchanged. In another embodiment, all switches can be of solid-state type.

A third solid-state relay 406 (SSRB1) replaces the second pre-charge device 222, and main switch 224 of the first embodiment. Also, switch 256 has been replaced by a fourth solid-state relay 408 (SSRB3) at the second positive charge terminal 252. The controller 112 can turn the third solid-state relay 406 on or off or make it act as a variable resistor. Also, the controller 112 can turn the fourth solid-state relay 408 on or off. The second fuse 238 (Pyro 2) has been removed altogether. The locations of solid-state relay 406 and switch 236 can be interchanged. Similarly, locations of solid-state relay 408 and switch 258 can be interchanged. In another embodiment, all switches can be of solid-state type.

Figure 5:
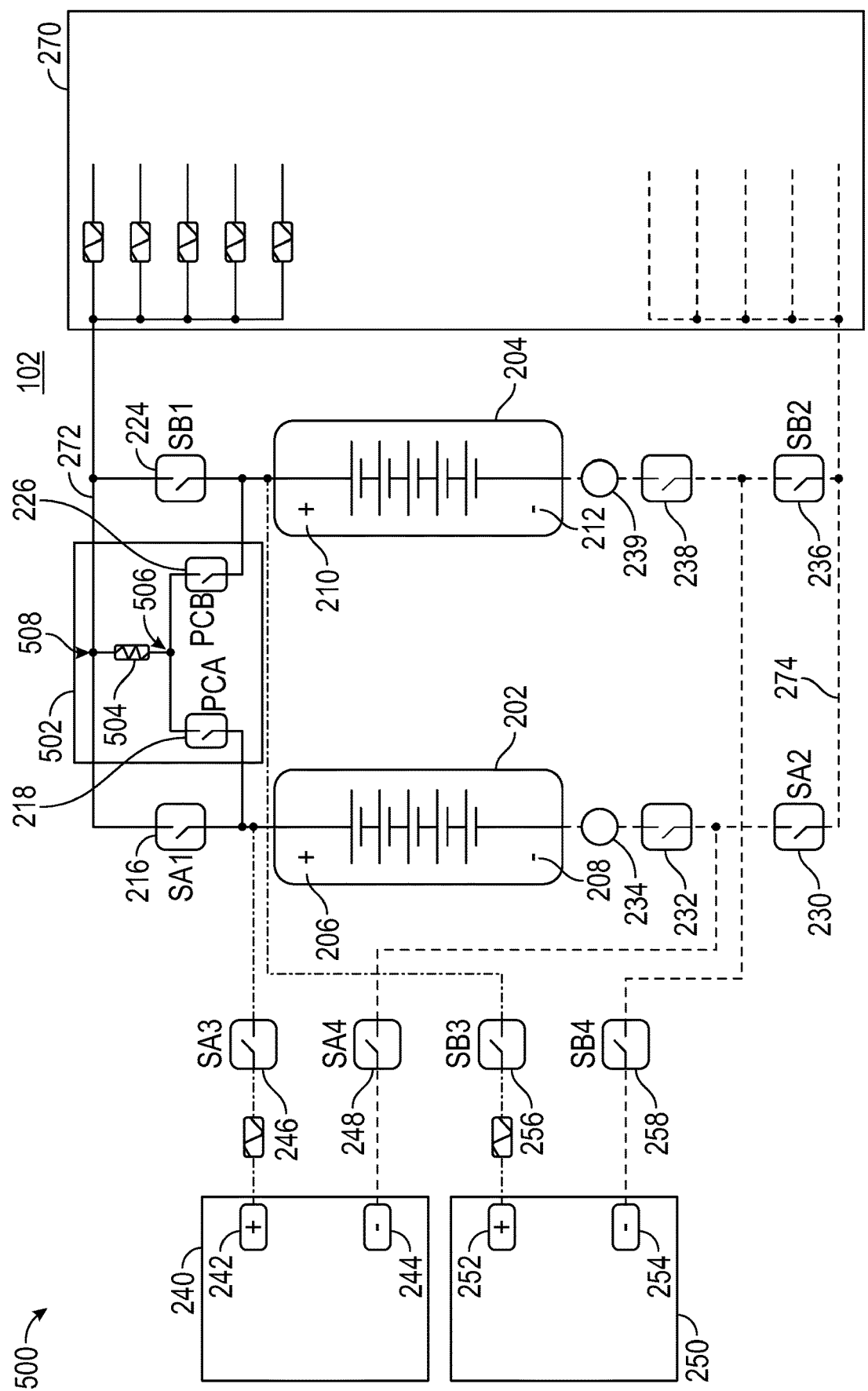
FIG. 5 shows a circuit diagram of the electrical system in a fourth embodiment.

FIG. 5 shows a circuit diagram 500 of the electrical system 102, in a fourth embodiment. The first pre-charge device 214 and the second pre-charge device 222 of the first embodiment have been replaced by a single pre-charge device 502 that includes a single resistor 504 that is shared between the first battery subpack 202 and the second battery subpack 204. The single pre-charge device 502 includes the first pre-charge switch 218 (PCA), and the second pre-charge switch 226 (PCB) and the single pre-charge resistor 504. The first pre-charge switch 218 (PCA) and the second pre-charge switch 226 (PCB) connect from the first battery subpack 202 and the second battery subpack 204, respectively, to a first end 506 of the single resistor 504. The first main switch 216 (SA1) and the second main switch 224 (SB1) connect from their respective battery subpacks to a second end 508 of the single resistor 504. The second end 508 is connected to the HV positive bus 272 of the propulsion and accessory loads 270.

Figure 6:
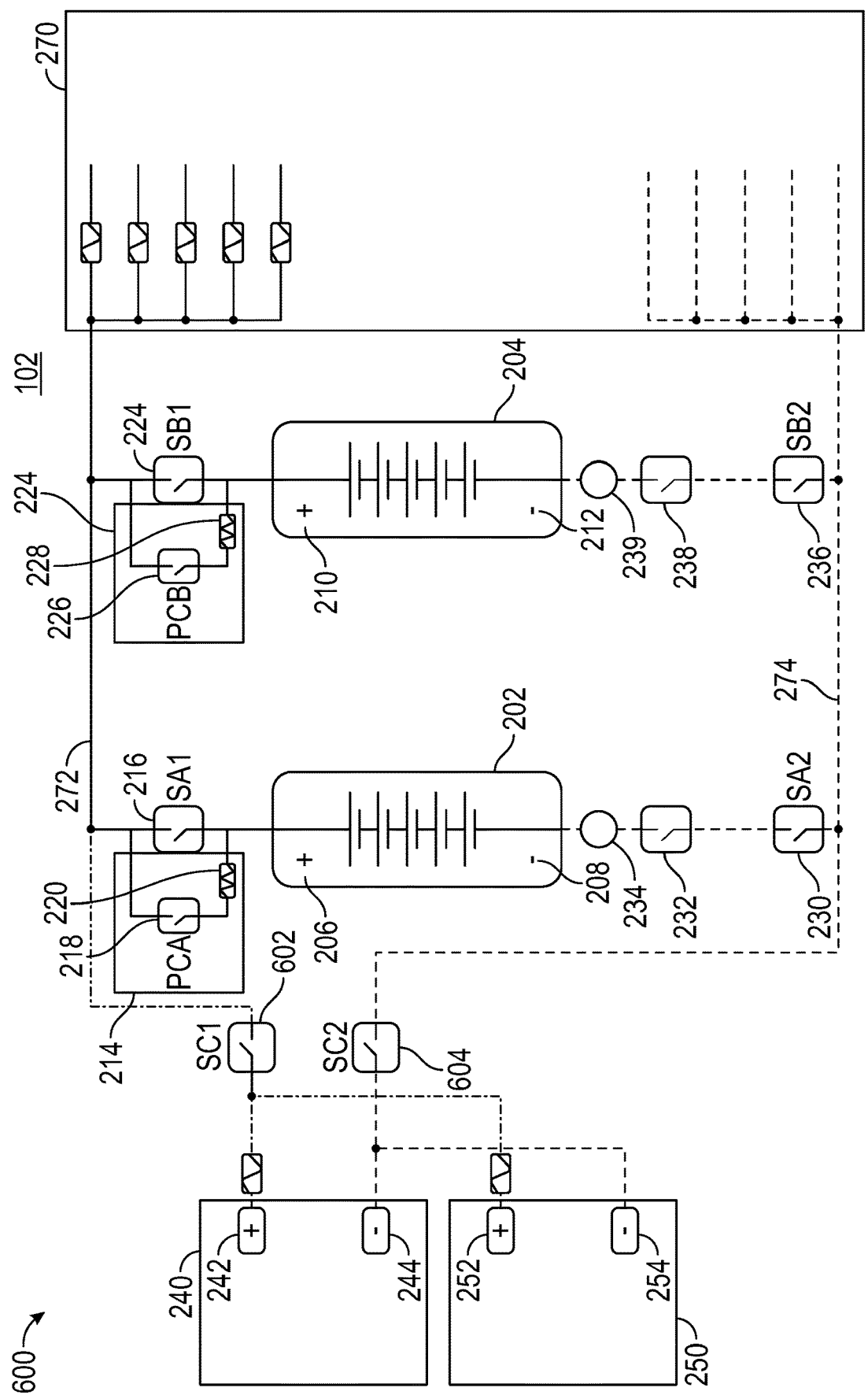
FIG. 6 shows a circuit diagram of the electrical system in a fifth embodiment.

FIG. 6 shows a circuit diagram 600 of the electrical system 102, in a fifth embodiment. In the fifth embodiment, the first positive charge terminal 242 of the first charge port 240 is electrically connected to the second positive charge terminal 252 of the second charge port 250. These charge ports can be coupled to the first positive terminal 206 of the first battery subpack 202 and the second positive terminal 210 of the second battery subpack 204 by a first charge switch 602 (SC1).

Also, the first negative charge terminal 244 of the first charge port 240 is electrically connected to the second negative charge terminal 254 of the second charge port 250. These charge ports can be connected to the first negative terminal 208 of the first battery subpack 202 and the second negative terminal 212 of the second battery subpack 204 by a second charge switch 604 (SC2).

Thus, the first charge port and the second charge port are electrically connected to each other. This is in distinction from the first embodiment in which the first connection is electrically isolated from the second connection.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of charging an electric vehicle, comprising:
controlling, via a processor, a first connection between a first battery subpack and a first charge port and a second connection between a second battery subpack and a second charge port to charge each of the first battery subpack and the second battery subpack while providing power to an electrical load, wherein the first battery subpack, the second battery subpack, and the electrical load of the electric vehicle are connected in parallel.

2. The method of claim 1, further comprising providing power to the electrical load from both the first battery subpack and the second battery subpack while charging using only one of the first charge port and the second charge port.

3. The method of claim 1, further comprising charging the first battery subpack via the first charge port and the second battery subpack via the second charge port while providing power to the electrical load via only one of the first battery subpack and the second battery subpack.

4. The method of claim 1, further comprising performing a pre-charging operation at one of the first battery subpack and the second battery subpack prior to charging a respective one of the first battery subpack and the second battery subpack.

5. The method of claim 4, wherein performing the pre-charging operation further comprises one of: (i) pre-charging one of a first pre-charge resistor associated with the first battery subpack and a second pre-charge resistor associated with the second battery subpack; (ii) controlling one of a first solid-state relay associated with the first battery subpack and a second solid-state relay associated with the second battery subpack; and (iii) pre-charging using a resistor shared by the first battery subpack and the second battery subpack.

6. The method of claim 1, further comprising one of: (i) blowing a first charge port fuse at the first charge port in a presence of an overcurrent at the first charge port; (ii) detecting, during individual charging of the first battery subpack, the overcurrent at the first charge port via a first charge port current sensor associated with the first charge port and blowing a first pyro fuse associated with the first battery subpack in response to a signal from the first charge port current sensor; and (iii) detecting, during charging of both the first battery subpack and the second battery subpack, the overcurrent at the first charge port via the first charge port current sensor associated with the first charge port and blowing the first pyro fuse associated with the first battery subpack and a second pyro fuse associated with the second battery subpack in response to the signal from the first charge port current sensor.

7. The method of claim 1, wherein one of: (i) the first connection is electrically isolated from the second connection; and (ii) the first charge port and the second charge port are electrically connected to each other.

8. An electrical system of an electric vehicle, comprising:
a first battery subpack;
a second battery subpack, wherein the first battery subpack, the second battery subpack, and an electrical load of the electric vehicle are connected in parallel; and
a processor configured to control a first connection between the first battery subpack and a first charge port and a second connection between the second battery subpack and a second charge port to charge each of the first battery subpack and the second battery subpack while providing power to the electrical load.

9. The electrical system of claim 8, wherein the processor is further configured to control the first connection and the second connection to provide power to the electrical load from both the first battery subpack and the second battery subpack while charging only one of the first battery subpack and the second battery subpack.

10. The electrical system of claim 8, wherein the processor is further configured to control the first connection and the second connection to charge the first battery subpack via the first charge port and the second battery subpack via the second charge port while providing power to the electrical load via only one of the first battery subpack and the second battery subpack.

11. The electrical system of claim 8, wherein the processor is further configured to perform a pre-charging operation at one of the first battery subpack and the second battery subpack prior to charging a respective one of the first battery subpack and the second battery subpack.

12. The electrical system of claim 11, wherein performing the pre-charging operation further comprises one of: (i) pre-charging one of a first pre-charge resistor associated with the first battery subpack and a second pre-charge resistor associated with the second battery subpack; (ii) controlling one of a first solid-state relay associated with the first battery subpack and a second solid-state relay associated with the second battery subpack; and (iii) pre-charging using a resistor shared by the first battery subpack and the second battery subpack.

13. The electrical system of claim 8, further comprising one of: (i) a first charge port fuse at the first charge port configured to blow in a presence of an overcurrent at the first charge port; (ii) a first charge port current sensor at the first charge port configured to send a signal upon detecting the overcurrent at the first charge port; and (iii) a first pyro fuse associated with the first battery subpack and a second pyro fuse associated with the second battery subpack, wherein the first pyro fuse is configured to blow in response to the signal during individual charging of the first battery subpack and the first pyro fuse and the second pyro fuse are configured to blow in response to the signal during charging of both the first battery subpack and the second battery subpack.

14. The electrical system of claim 8, wherein one of: (i) the first connection is electrically isolated from the second connection; and (ii) the first charge port and the second charge port are electrically connected to each other.

15. An electric vehicle, comprising:
   a first battery subpack;
   a second battery subpack, wherein the first battery subpack, the second battery subpack, and an electrical load of the electric vehicle are connected in parallel; and
   a processor configured to control a first connection between the first battery subpack and a first charge port and a second connection between the second battery subpack and a second charge port to charge each of the first battery subpack and the second battery subpack while providing power to the electrical load.

16. The electric vehicle of claim 15, wherein the processor is further configured to control the first connection and the second connection to provide power to the electrical load from both the first battery subpack and the second battery subpack while charging only one of the first battery subpack and the second battery subpack.

17. The electric vehicle of claim 15, wherein the processor is further configured to control the first connection and the second connection to charge the first battery subpack via the first charge port and the second battery subpack via the second charge port while providing power to the electrical load via only one of the first battery subpack and the second battery subpack.

18. The electric vehicle of claim 15, wherein the processor is further configured to perform a pre-charging operation at one of the first battery subpack and the second battery subpack prior to charging a respective one of the first battery subpack and the second battery subpack, wherein the pre-charging operation is performed at one of: (i) a first pre-charge resistor associated with the first battery subpack and a second pre-charge resistor associated with the second battery subpack; (ii) a first solid-state relay associated with the first battery subpack and a second solid-state relay associated with the second battery subpack; and (iii) a resistor shared by the first battery subpack and the second battery subpack.

19. The electric vehicle of claim 15, further comprising one of: (i) a first charge port fuse at the first charge port configured to blow in a presence of an overcurrent at the first charge port; (ii) a first charge port current sensor at the first charge port configured to send a signal upon detecting the overcurrent at the first charge port; and (iii) a first pyro fuse associated with the first battery subpack and a second pyro fuse associated with the second battery subpack, wherein the first pyro fuse is configured to blow in response to the signal during individual charging of the first battery subpack and the first pyro fuse and the second pyro fuse are configured to blow in response to the signal during charging of both the first battery subpack and the second battery subpack.

20. The electric vehicle of claim 15, wherein one of: (i) the first connection is electrically isolated from the second connection; and (ii) the first charge port and the second charge port are electrically connected to each other.

\* \* \* \* \*